Figure 1:
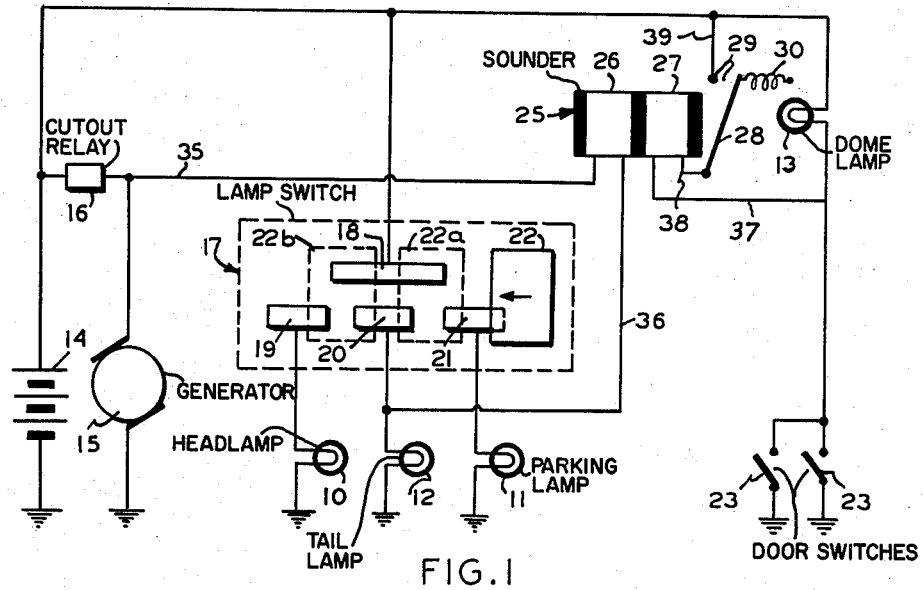

March 2, 1965 G. L. WEBB ETAL 3,172,080

VEHICLE WARNING SYSTEM

Filed Oct. 17, 1961

*INVENTORS*
ERICH E. LATE
BY GEORGE L. WEBB

*Robert D. Sommer*

AGENT

United States Patent Office 3,172,080
Patented Mar. 2, 1965

3,172,080
VEHICLE WARNING SYSTEM
George L. Webb and Erich E. Late, Lancaster, Ohio, assignors to Essex Wire Corporation, a corporation of Michigan
Filed Oct. 17, 1961, Ser. No. 145,587
5 Claims. (Cl. 340—52)

This invention relates to signaling systems for automotive vehicles and, more particularly, to signaling systems for warning the operator of a vehicle that an electrically operated device, such as the vehicle headlamps, have been left energized when the vehicle is stopped.

Heretofore, numerous signaling systems have been proposed for sounding an alarm when an operator of a vehicle stops or leaves the vehicle while the vehicle headlamps or other electrical device is left energized. While use of such signaling systems is desirable for insuring against accidentally discharged batteries, the prior known signaling systems have not been widely adopted, largely because they have required the use of costly relay systems in addition to a sounder, required alteration of the existing vehicle electrical system, or were not entirely reliable and satisfactory in operation.

Accordingly, it is the object of this invention to provide a vehicle warning system of the foregoing character which employs only a single, inexpensive and simple sounder which may be readily connected to the existing vehicle electrical system without any alteration thereof, and which will be satisfactory and reliable in operation.

A further object of this invention is to provide a vehicle warning system of the foregoing character which will not provide a nuisance signal while the vehicle engine is operating.

In the preferred embodiments of this invention, the warning system comprises a sounder having a vibrating armature operated by an electromagnet with two coils. One coil of the sounder is connected to the vehicle battery through a headlamp control switch and the other coil of the sounder is connected to the vehicle battery through one or more of the door-operated switches which control the dome lamp of the vehicle. The sounder also includes normally open switch contacts connected in series with one of the coils so that the one coil cannot be energized until the other coil has been energized and has caused the sounder contacts to be closed. The two coils are so wound and connected as to magnetically oppose each other when simultaneously energized from the battery. Thus, when both the headlamp switch and the door-operated switch are closed to complete both coil circuits, the sounder armature will be vibrated in response to changes in the magnetization of the electromagnet as the sounder switch contacts alternately open and close.

In addition, means responsive to operation of the vehicle engine are connected in one of the coil circuits for preventing energization of a coil while the engine is in operation, even while idling. In one embodiment, the one coil circuit is connested to the vehcile generator with the coil and headlamp switch connected in a series circuit that is in shunt with the vehicle reverse-current cutout relay. In the other embodiment, a switch responsive to the oil pressure in the lubricating system is connected to interrupt the one coil circuit when the vehicle engine is operating.

Figure 2:
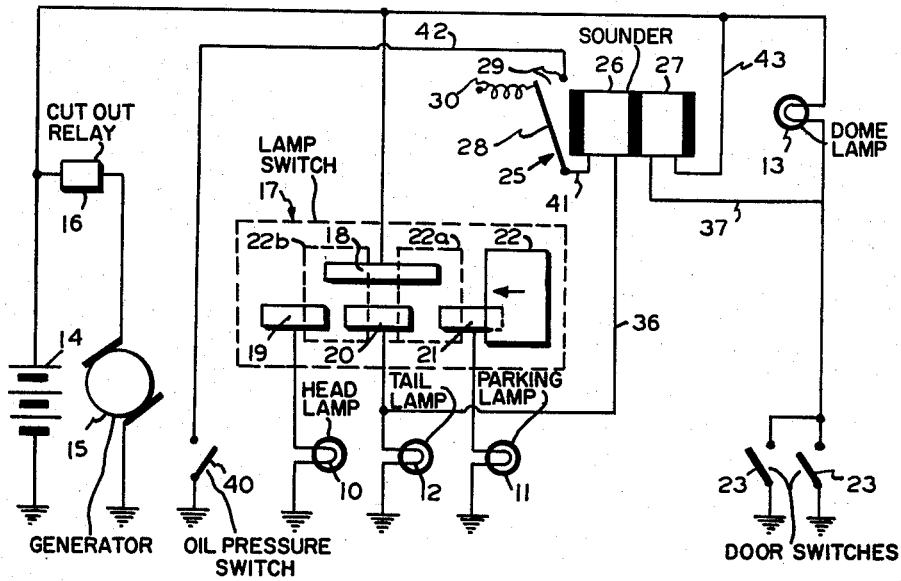

The invention will be more fully understood by reference to the following description taken in connection with the accompanying drawing, in which:

FIGURE 1 is a schematic electrical diagram illustrating one embodiment of the invention; and FIGURE 2 is a schematic electrical diagram illustrating another embodiment of the invention.

Referring first to both figures of the drawing, the usual lighting system for automotive vehicles is illustrated as including front-mounted, grounded headlamps represented by reference numeral 10 and parking lamps represented by reference numeral 11, rear-mounted, grounded tail lamps represented by reference numeral 12, and one or more interior-mounted dome lamps 13. The lamps are selectively energized from the grounded vehicle battery 14 which is connected in pararllel with the grounded generator 15 by the usual reverse-current cutout relay 16 which disconnects the battery 14 from the generator 15 when the generator voltage is below that of the battery 14. The headlamps 10, parking lamps 11 and tail lamps 12 are selectively energized through a conventional, manually operated lamp control switch 17. The switch 17 includes a battery stationary contact 18, a headlamp stationary contact 19, a tail lamp stationary contact 20 and a parking lamp stationary contact 21, as well as a movable contact bridging member 22. In the illustrated full line or "off" position of the bridging member 22, the bridging member 22 is disengaged from the battery contact 18. In the "parking lamps on" position of the bridging member 22 as indicated by the dotted lines 22a, bridging member 22 connects the parking lamp contact 21 and the tail lamp contact 20 to the battery contact 18. In the "headlamps on" position of the bridging member 22 as indicated by the dotted lines 22b, the bridging member 22 connects the headlamp contact 19 and the tail lamp contact 20 to the battery contact 18. The dome lamp 13 is energized through any of the door-actuated control switches 23 which are closed when the vehicle doors are open.

In accordance with this invention as embodied in FIGURE 1, there is provided an electromagnetic sounder 25 of the differentially wound type having coils 26 and 27, an armature actuated by the coils 26 and 27, and the normally open switch contacts 29 closed by actuation of the armature 28. Mechanical means such as a spring 30 urge the armature 28 toward the normally open position of the contacts 29. The sounder 25 is preferably so constructed that the coil 26 must be energized with a voltage somewhat greater that the difference between the voltage of the battery 14 and the voltage output of the generator 15 while the vehicle engine is idling before the armature 28 is actuated to close the switch contacts 29. In addition, the two coils 26 and 27 are wound to exert approximately equal actuating forces on the armature 29 when energized with equal voltages. The coil 26 is connected to the generator 15 by the conductor 35 and to the tail lamp contact 20 of the switch 17 by the conductor 36. The other coil 27 is connected to the door switches 23 by the conductor 37 and to the battery 14 through a circuit which includes the conductor 38 from the coil 27 to one of the switch contacts 29 and the conductor 39 from the other of the switch contacts 29 to the battery 14. The coils 26 and 27 are so connected that when simultaneously energized from the battery 14, coil 26 will magnetically oppose coil 27.

The operation of the embodiment of the invention shown in FIGURE 1 is as follows: Assuming that the vehicle engine has been shut off with the lamp switch 17 in either of its "on" positions and no vehicle door has been opened, the generator 15 has no output voltage and all the door switches 23 are open. With these conditions, the sounder coil 26 is energized from the battery 14 by a circuit through the contact 18, the bridging member 22, the contact 20, the conductor 36, the coil 26, the conductor 35, and the generator 15. The energized coil 26 causes the sounder switch contacts 29 to be closed by the armature 28 but the coil 27 remains unenergized since the door switches 23 are all open. If one of the vehicle doors now be opened thereby closing one of the door switches 23, the coil 27 is energized from the battery 14 by a circuit through the conductor 39, the switch contacts 29, the conductor 38, the coil 27, the conductor 37 and the closed door switch 23. As now energized, the coils 26 and 27 are oppositely acting magnetically and have no appreciable magnetic effect on the armature 28 which is returned to its original position by the spring 30. As the armature 28 returns to its original position, the contacts 29 re-open to de-energize the coil 27 with the result that the coil 26 again acts on the armature 28 to repeat the cycle. The resulting oscillation or vibrating of the armature 28 provides an audible signal warning that the vehicle lamps have been left energized. If the lamp switch 17 then be shifted to its "off" position, the coil 26 is de-energized to silence the signal. If, instead, it is desired to leave the lamps energized, the shutting of the opened vehicle door opens the door switch to de-energize the coil 27 and thus silence the signal.

No signal will be given if the vehicle doors are opened as to discharge a passenger while the vehicle engine is operating at idling speed with the lamp switch 17 in either of its "on" positions. As pointed out above, the energizing circuit for the coil 26 includes the generator 15, and, as its voltage is in opposition to the voltage of the battery 14, the net energizing voltage, if any, for the coil 26 is insufficient to cause the armature 28 to close the contacts 29. Since the contacts 29 must be closed for the sounder 25 to provide a signal, no nuisance signal will be given when any door switch 23 is closed by opening of a vehicle door while the engine is operating.

If the vehicle engine is operated while the lamp switch 17 is in its "off" position, the coil 26 is energized from the generator 15 by a circuit through the conductor 35, the coil 26, the conductor 36, and the tail lamps 12. It is to be noted that under these circumstances, the current passes through the coil 26 in a direction opposite to that when the coil 26 is energized from the battery. Even if the current through the coil 26 is sufficient to cause closing of the contacts 29 under these conditions, the closing of a door switch 23 will not result in oscillation of the armature 28 because the magnetic actuating forces of the coils 26 and 27 are in the same direction and will merely hold the armature 28 in the closed position of the contacts 29.

In the embodiment of the invention shown in FIGURE 2, the sounder contacts 29 are connected in circuit with the coil 26 instead of the coil 27. This change has no effect upon the function of the warning system, but merely affects which coil is continuously energized under the various operationg conditions. The embodiment of FIGURE 2 further differs from that of FIGURE 1 in the substitution of a circuit connection of the coil 26 to a switch 40 responsive to vehicle engine operation for a circuit connection to the generator 15. While it is contemplated that other switch devices may be employed for the switch 40, this switch preferably is controlled by the oil pressure in the lubricating system of the vehicle engine. In this arrangement, the coil 26 is connected to one of the contacts 29 by the conductor 41 and the other contact 29 is connected to the grounded switch 40 by the conductor 42. The other coil 27 is connected to the battery 14 by the conductor 43. Other than as above described, the parts in the second embodiment are identical to the parts in the first embodiment.

The operation of the second embodiment is generally the same as described in connection with the first embodiment. The switch 40 will normally be opened whenever the vehicle engine is operating and the sounder 25 cannot provide a signal when the engine is operating. However, if any of the door switches 23 be closed by opening of a vehicle door with the lamp switch in either of its "on" positions and with the switch 40 closed, the energizing circuits for the coils 26 and 27 will be completed, causing the armature 28 to oscillate and provide the warning signal.

It will be apparent that, if there is no objection to a nuisance signal when the vehicle doors are opened with the vehicle engine in operation to discharge or receive a passenger, the conductor 35 from coil 26 in FIGURE 1 and the conductor 42 from coil 26 in FIGURE 2 could be connected directly to the grounded circuit of the vehicle. However, since the generator and the oil pressure switch are usually components of the existing electrical system, their use in the warning systems requires the use of only a single additional conductor, It will also be noted that the warning systems of the present invention require only the addition of a single, simple and inexpensive device, sounder 25, together with its connecting conductors to the usual electrical systems found in motor vehicles. Furthermore, the systems are operative to provide a warning signal only when the vehicle operator leaves the vehicle lamps turned on with the vehicle engine not operating and with a vehicle door open.

What is claimed is:

1. A lighting circuit warning system for a motor vehicle having an electric storage battery, a normally open door switch closed responsive to the opening of the vehicle door, and a lighting circuit connected to said battery and including a vehicle lamp and a lamp control switch movable between an "on" position wherein said lamp is energized and an "off" position wherein said lamp is de-energized, said system comprising the combination with said storage battery, said door switch and said lamp control switch of:

an electromagnetic sounder warning signal having a first coil, a movable signal-armature biased to a first position and attracted by said first coil when individually energized to a second position, electrical contact means opened when said signal-armature is in said first position and closed when said signal-armature is in said second position, and a second coil wound to produce a magnetic field substantially equal and in opposition to the field of said first coil when said coils are simultaneously energized by said battery, said fields when in opposition having no substantial attracting effect on said signal-armature whereby energization of said second coil through said contact means concurrently with energization of said first coil causes said signal-armature to vibrate between said first and second positions to produce an audible warning signal;

a first coil circuit including said first coil, and a second coil circuit including said second coil and said contact means in series connection;

first and second means separately connecting said battery to said first and second coil circuits, respectively, with said windings being connected to provide opposing fields when simultaneously energized from said battery, one of said connecting means including said door switch, and the other of said connecting means including said lamp control switch.

2. A lighting circuit warning system according to claim 1 including electrically conductive means connected to one of said coil circuits and responsive to operation of the motor vehicle to prevent any substantial current flow from said battery through said one coil circuit when the motor vehicle is in operation.

3. A lighting circuit warning system for a motor vehicle having an electric storage battery, a generator connected by a cutout switch to said battery, a dome light circuit connected to said battery and including a dome lamp and a normally opened door switch which is closed upon opening of a door of the vehicle to energize the dome lamp, a lighting circuit connected to said battery and including a vehicle lamp and a lamp control switch movable between an "on" position wherein said lamp is energized and an "off" position wherein said lamp is de-energized, said system comprising the combination with said storage battery, said generator, said door switch and said lamp control switch of:

an electromagnetic sounder warning signal having a first coil, a movable signal-armature biased to a first position and attracted by said first coil when individually energized to a second position, electrical contact means opened when said signal-armature is in said first position and closed when said signal-armature is in said second position, and a second coil wound to produce a magnetic field substantially equal and in opposition to the field of said first coil when said coils are simultaneously energized by said battery, said fields when in opposition having no substantial attracting effect on said signal-armature whereby energization of said second coil through said contact means concurrently with energization of said first coil causes said signal-armature to vibrate between said first and second positions to produce an audible warning signal;

a first coil circuit including said first coil, and a second coil circuit including said second coil and said contact means in series connection;

first and second energizing circuits separately connecting said first and second coil circuits, respectively, to said battery with said coils being connected to provide opposing fields when simultaneously energized from said battery, one of said energizing circuits including in series connection said generator and said lamp control switch, and the other of said energizing circuits including said door switch.

4. A lighting circuit warning system for a motor vehicle having an electric storage battery, a condition responsive switch having normally closed contacts actuated to open position in response to operation of the vehicle engine, a dome light circuit connected to said battery and including a dome lamp and a normally open door switch which is closed upon opening a door of the vehicle to energize the dome lamp, and a lighting circuit connected to said battery and including a vehicle lamp and a lamp control switch movable between an "on" position wherein said lamp is energized and an "off" position wherein said lamp is de-energized, said system comprising the combination with said storage battery, said condition responsive switch, said door switch and said lamp control switch of:

an electromagnetic sounder warning signal having a first coil, a movable signal-armature biased to a first position and attracted by said first coil when individually energized to a second position, electrical contact means opened when said signal-armature is in said first position and closed when said signal-armature is in said second position, and a second coil wound to produce a magnetic field substantially equal and in opposition to the field of said first coil when said coils are simultaneously energized by said battery, said fields when in oppositon having no substantial attracting effect on said signal-armature whereby energization of said second coil through said contact means concurrently with energization of said first coil causes said signal-armature to vibrate between said first and second positions to produce an audible warning signal;

a first coil circuit including said first coil, and a second coil circuit including said second coil and said contact means in series connection;

first and second energizing circuits separately connecting said first and second coil circuits, respectively, to said battery with said coils being connected to provide opposing fields when simultaneously energized from said battery, one of said energizing circuits including in series connection said condition responsive switch and said lamp control switch, and the other of said energizing circuits including said door switch.

5. A lighting circuit warning system according to claim 4 wherein said condition responsive switch is a pressure responsive switch operatively connected to the lubricating system of the vehicle engine.

References Cited by the Examiner
UNITED STATES PATENTS

| | | | |
|---|---|---|---|
| 2,101,407 | 12/37 | Moreland | 340—52 |
| 2,549,450 | 4/51 | Gordon | 340—52 |
| 2,799,843 | 7/57 | Savino | 340—52 |
| 2,820,215 | 1/58 | Hughes | 340—52 |
| 2,839,736 | 6/58 | Tinsley et al. | 340—63 |

NEIL C. READ, *Primary Examiner.*

BENNETT G. MILLER, *Examiner.*